(12) United States Patent
Frembgen et al.

(10) Patent No.: US 11,037,467 B2
(45) Date of Patent: Jun. 15, 2021

(54) SUCTION SIMULATION SYSTEM (71) Applicant: IngMar Medical, Ltd., Pittsburgh, PA (US)

(72) Inventors: Stefan Frembgen, Pittsburgh, PA (US); Amanda Dexter, Pittsburgh, PA (US)

(73) Assignee: IngMar Medical, Ltd., Pittsburgh, PA (US)

( * ) Notice: Subject to any disclaimer, the term of this patent is extended or adjusted under 35 U.S.C. 154(b) by 0 days.

(21) Appl. No.: 16/875,352

(22) Filed: May 15, 2020

(65) Prior Publication Data

US 2020/0279507 A1 Sep. 3, 2020

Related U.S. Application Data

(62) Division of application No. 15/192,342, filed on Jun. 24, 2016, now abandoned.

(60) Provisional application No. 62/185,097, filed on Jun. 26, 2015.

(51) Int. Cl.
*G09B 23/28* (2006.01)
(52) U.S. Cl.
CPC ................................ *G09B 23/285* (2013.01)
(58) Field of Classification Search
None
See application file for complete search history.

(56) References Cited

U.S. PATENT DOCUMENTS

| | | | |
|---|---|---|---|
| 2007/0218438 A1 | 9/2007 | Sanders et al. | |
| 2009/0192505 A1 | 7/2009 | Askew et al. | |
| 2011/0178419 A1 | 7/2011 | Wood et al. | |
| 2015/0079567 A1* | 3/2015 | Mansi | G09B 23/288 |
| | | | 434/265 |

FOREIGN PATENT DOCUMENTS

| | | |
|---|---|---|
| CN | 105788421 A | 7/2016 |
| CN | 205943276 U | 2/2017 |
| JP | 2014206570 A | 10/2014 |

* cited by examiner

*Primary Examiner* — Bruk A Gebremichael
(74) *Attorney, Agent, or Firm* — The Webb Law Firm (57) ABSTRACT

A suction simulation device includes a suction catheter and a suction unit in fluid communication with the suction catheter. The suction unit includes a reservoir for holding fluid and the suction unit is configured to provide vacuum capability to the suction catheter. The suction simulation device also includes a pump in fluid communication with the suction unit, the pump configured to flow the fluid from the reservoir. The suction simulation device is adapted for use with a manikin comprising an airway. Also disclosed is a suction simulation system and a method of simulating a scenario requiring mechanical ventilation.

17 Claims, 8 Drawing Sheets

SUCTION SIMULATION SYSTEM

CROSS-REFERENCE TO RELATED APPLICATIONS

This application is a divisional of U.S. patent application Ser. No. 15/192,342, filed Jun. 24, 2016, which claims the benefit of U.S. Provisional Application No. 62/185,097, filed on Jun. 26, 2015, the disclosures of which are hereby incorporated in their entireties by reference.

BACKGROUND OF THE INVENTION

Field of the Invention

The present invention relates to a suction simulation device, system, and method for flowing simulated mucus into the airway of a manikin for training students to properly use a suction unit for mechanical ventilation.

Description of Related Art

A frequent complication during mechanical ventilation is the build-up of mucus in a patient's airway. The effect of such build-up is a gradual or sometimes catastrophic obstruction of the patient's airway, such as a mucus plug. It may lead to the inadvertent modification of ventilation in a way that is detrimental to the patient. Therefore, it is important for students being trained in mechanical ventilation to recognize and manage the build-up of mucus in the patient's airway, both in a hospital setting and in a home care setting where mechanical ventilation has become a more frequently accepted form of treatment.

The remedy for the build-up of mucus in a patient's airway is suction of the airway using a suction unit. This remedy introduces the risk of infection, specifically in intubated patients, and injury due to inappropriate settings of the vacuum of the suction unit. Suction of the airway is a special skill that requires training. To enable such training, it is necessary to have a simulation system that is capable of generating simulated mucus build-up inside of the airway of a manikin simulator and software to realistically simulate situations requiring mechanical ventilation.

SUMMARY OF THE INVENTION

In one embodiment, a suction simulation device for use with a manikin having an airway includes a suction catheter and a suction unit in fluid communication with the suction catheter. The suction unit includes a reservoir for holding fluid and the suction unit is configured to provide suction to the suction catheter. The suction simulation device also includes a pump in fluid communication with the suction unit, the pump configured to flow the fluid from the reservoir. The suction simulation device is adapted for use with the manikin's airway.

The suction simulation device may include an endotracheal tube which may include a proximal end and a distal end, and further have a distal end pressure transducer positioned at the distal end of the endotracheal tube to read a pressure at the distal end of the endotracheal tube and a proximal end pressure transducer positioned at the proximal end of the endotracheal tube to read a pressure at the proximal end of the endotracheal tube, where the endotracheal tube is in fluid communication with the suction catheter when the suction catheter is used to remove fluid from the manikin's airway. Alternatively, the endotracheal tube may include a proximal end and a distal end, and further include a distal end pressure transducer positioned at the proximal end of the endotracheal tube to read a pressure at the distal end of the endotracheal tube and a proximal end pressure transducer positioned at the proximal end of the endotracheal tube to read a pressure at the proximal end of the endotracheal tube, and this endotracheal tube may further include a lumen in fluid communication with the distal end pressure transducer, where the endotracheal tube is in fluid communication with the suction catheter when the suction catheter is used to remove fluid from the manikin's airway. Alternatively, the endotracheal tube may have a proximal end and a distal end, and further have a pressure transducer configured to determine a pressure differential between the distal end and proximal end of the endotracheal tube, where the endotracheal tube is in fluid communication with the suction catheter when the suction catheter is used to remove fluid from the manikin's airway.

The suction unit may further include a secondary reservoir in fluid communication with the reservoir. The suction simulation device may include a fluid inlet tube having a distal end and a proximal end, the fluid inlet tube being in fluid communication with the reservoir. The fluid inlet tube may co-act with the endotracheal tube such that the distal end of the fluid inlet tube is positioned proximate the distal end of the endotracheal tube. The proximal end of the fluid inlet tube may be in fluid communication with the pump. The suction simulation device may include a control device in communication with the pump and configured to control the pump. The fluid from the reservoir may be a viscous fluid.

In another embodiment, a suction simulation system may include a manikin comprising an airway configured to hold fluid and a suction simulation device. The suction simulation device may include a suction catheter and a suction unit in fluid communication with the suction catheter. The suction unit may include a reservoir for holding the fluid and the suction unit may be configured to provide vacuum capability to the suction catheter such that the suction catheter can aspirate the fluid from the airway of the manikin. The suction simulation device may also include a pump in fluid communication with the suction unit, the pump configured to flow the fluid from the reservoir to the manikin The suction simulation system may further include a breathing simulator in fluid communication with the airway of the manikin and configured to flow gas into the airway of the manikin. The breathing simulator may be configured to cause a physical response from the manikin. The suction simulation system may further include simulation software to execute a mechanical ventilation scenario. The airway of the manikin may be in fluid communication with the pump.

In another embodiment, a method of simulating a scenario requiring mechanical ventilation includes: providing a manikin with an airway configured to hold fluid; providing a suction simulation device having a suction catheter, a suction unit in fluid communication with the suction catheter, the suction unit having a reservoir for holding fluid and the suction unit configured to provide vacuum capability to the suction catheter and a pump in fluid communication with the suction unit and the airway of the manikin, the pump configured to flow the fluid from the reservoir; and running a mechanical ventilation scenario.

Running the mechanical ventilation scenario may include flowing fluid from the suction unit to the airway of the manikin using the pump and suctioning some of the fluid from the airway of the manikin using the suction catheter. The method may further include providing a breathing simulator in fluid communication with the airway of the manikin and flowing gas from the breathing simulator to the airway of the manikin. The method may further include providing simulation software, where running the mechanical ventilation scenario includes executing the simulation software. The suction simulation device may further include a control device in communication with the pump, and the step of running the mechanical ventilation scenario may include controlling the pump using the control device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "upper", "lower", "right", "left", "vertical", "horizontal", "top", "bottom", "lateral", "longitudinal", "proximal", "distal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
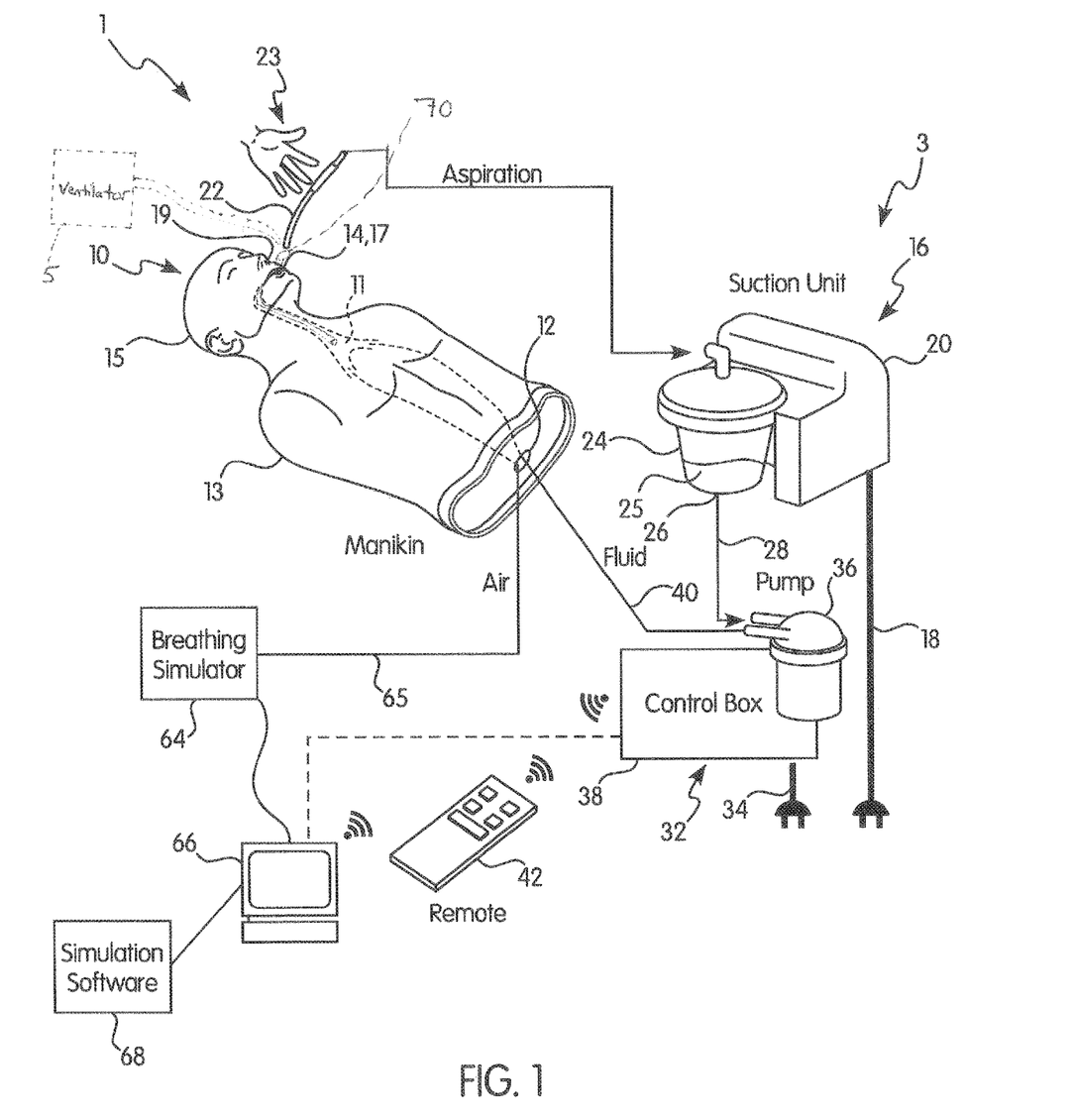
FIG. 1 shows a schematic process flow diagram of one embodiment of a simulation system having a manikin inlet.

Referring to FIG. 1, a suction simulation system (1) is shown that includes a suction simulation device (3) and a manikin (10) having an airway (11). The manikin (10) can be connected to a ventilator (5), such as coupled to an endotracheal tube (70) inserted into the airway (11) of the manikin (10). The airway (11) can hold fluid, such as simulated mucus (25), and the airway (11) may be an anatomically correct representation of a human airway (11). The simulated mucus (25) can be a viscous fluid. The suction simulation system (1) is configured to run mechanical ventilation scenarios (simulations). The manikin (10) may include an anatomically correct representation of a torso (13) and a head (15) of a human. During a simulation, the manikin (10) may exhibit physical responses pertinent to patients having an obstructed airway (11), such as breathing, coughing, burping, snoring, choking, gurgling, etc.

In one embodiment, simulated mucus (25) is flowed into the manikin (10) through a manikin inlet (12) and is aspirated out of the manikin (10) through a manikin outlet (14), such as a nose (19) or mouth (17) of the manikin (10). Simulated mucus (25) flows into the manikin (10), preferably at a flow rate of 1-50 mL/min, but this flow rate may be different should a given simulation scenario so require. The simulated mucus (25) is a viscous liquid gel that is purchased or made from "recipes" known in the art. Preferably, the simulated mucus (25) is made from non-food ingredients (e.g., cellulose or other gel-forming hydrophilic lubricants). Preferably, the simulated mucus (25) includes no organics and is not a suitable host for microorganisms.

Figure 2:
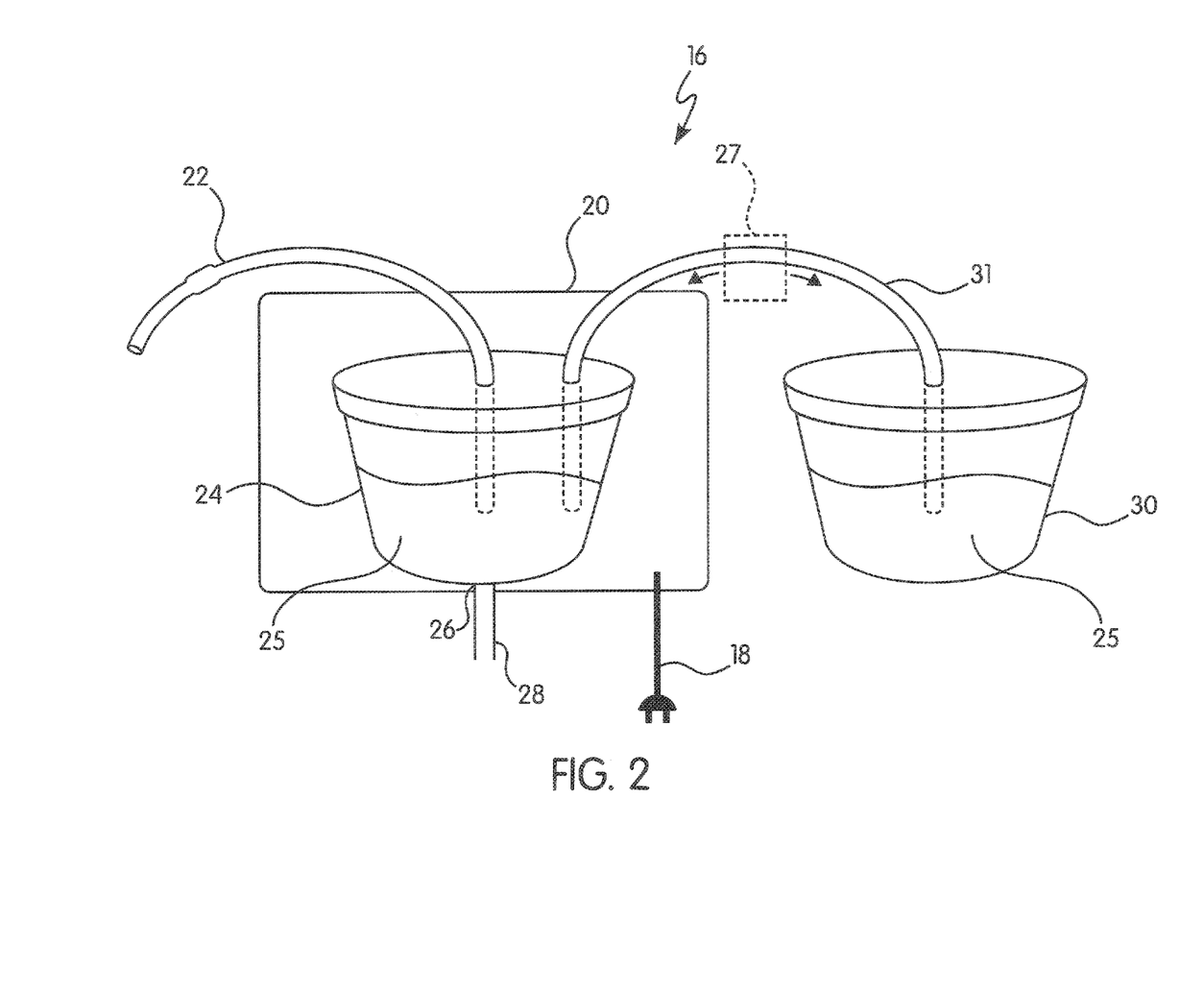
FIG. 2 shows a schematic diagram of one embodiment of a suction unit having a modified reservoir and a secondary reservoir.

Referring to FIGS. 1 and 2, the suction simulation system (1) includes the suction simulation device (3) that is adapted for use with the manikin (10), including the airway (11). The suction simulation device (3) may include a suction catheter or suction tube (22) in fluid communication with a suction unit (16). The suction catheter (22) may include a proximal end proximate the suction unit (16) and a distal end proximate the airway (11) when the suction catheter (22) is used to suction the manikin (10). The suction unit (16) may be a commercially-available suction unit (16) as commonly found in hospital intensive care units (ICUs) or emergency rooms (ERs). Examples of commercially available suction units (16) include the Laerdal Compact Suction Unit® 4 or the Vacu-Aide® QSU Suction Unit. Alternatively, the suction unit (16) can be a vacuum pump. The suction unit (16) has a suction unit power source (18). The suction unit (16) also includes a suction control (20). The suction control (20) powers on/off the suction unit (16) and varies the intensity of the vacuum capability of the suction catheter (22) controlled by a student (23), as shown in FIG. 1. In some embodiments of the present invention, vacuum adjustment capability of the suction unit (16) ranges from 50-550 mmHg and has a free flow of about 27 L/min. The vacuum capability of the suction unit (16) provides a negative pressure differential between the trachea and the distal end of the suction catheter (22) or suction which may be such that the suction catheter (22) can aspirate the simulated mucus (25) from the airway (11) of the manikin (10).

The suction unit (16) also includes a reservoir (24) which collects the simulated mucus (25) aspirated from the manikin (10) and the endotracheal tube (70) using the suction catheter (22). The reservoir (24) may include an exit region (26), as shown in FIGS. 1 and 2, to flow simulated mucus (25) out of the reservoir (24). A suction exit tube (28) is included in the suction unit (16) to flow simulated mucus (25) out of the reservoir (24) through the exit region (26).

In some embodiments of the invention, the total volume of simulated mucus (25) in the suction simulation system (1) is less than or equal to the maximum volume of the reservoir (24), such as 800 mL. However, in other embodiments of the invention, the suction unit (16) includes a secondary reservoir (30). The secondary reservoir (30) is another container for holding additional simulated mucus (25), and the secondary reservoir (30) is in fluid communication with the reservoir (24) such that the simulated mucus (25) stored in the secondary reservoir (30) may be flowed into the reservoir (24) and ultimately introduced into the suction simulation system (1). Since simulated mucus (25) may be lost during the running of a simulation, simulated mucus (25) from the secondary reservoir (30) may be flowed into the reservoir (24) to keep the total volume of simulated mucus (25) in the suction simulation system (1) at a sufficient level. A pump (27) can be provided in communication with a secondary reservoir tube (31), which runs between the reservoir (24) and the secondary reservoir (30), to permit simulated mucus (25) to travel to and from the secondary reservoir (30) and the reservoir (24). The pump (27) is controlled by a control box (38). This embodiment allows for the simulation to continue even if simulated mucus (25) is lost to the environment during the simulation. In another embodiment, the secondary reservoir (30) may be eliminated, and the simulated mucus (25) need not be returned to the reservoir (24) after use.

Figure 3:
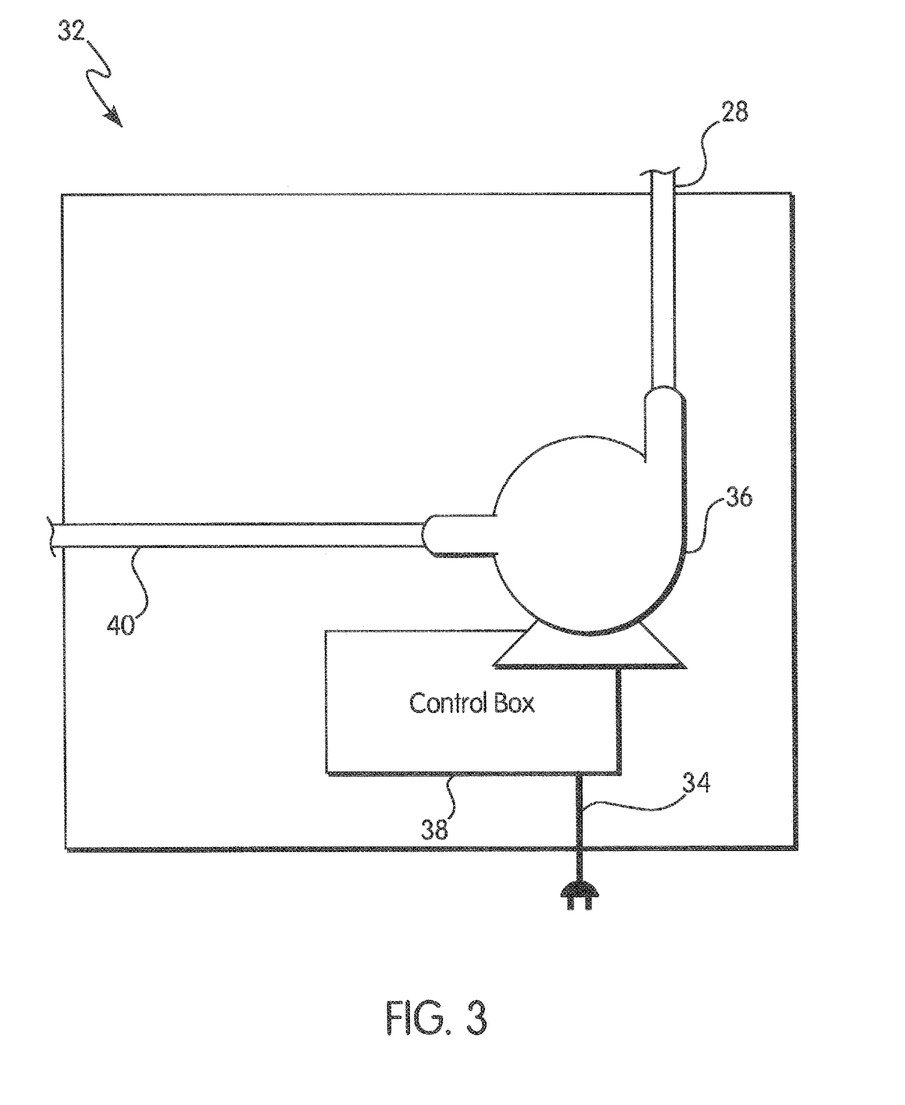
FIG. 3 shows a schematic diagram of one embodiment of a pump unit used in the simulation system according to the present invention.

Referring to FIGS. 1 and 3, the suction simulation device (3) also includes a pump unit (32). The pump unit (32) is housed in its own enclosure and attached proximate to the suction unit (16). The pump unit (32) includes a pump unit power source (34), a pump (36), the control box (38), and a pump exit tube (40). In one embodiment of the invention, the pump (36) is a peristaltic pump. The pump (36) is electrically connected to and controlled by the control box (38). The pump (36) at least has the capability of pumping simulated mucus (25) at a flow rate of between 1-50 mL/min, or any other flow rate realistic in a training scenario. The pump (36) may be in fluid communication with the suction unit and may pump simulated mucus (25) from the reservoir (24) via the suction exit tube (28) on one end and flow simulated mucus (25) toward the manikin (10) on the other end by way of the pump exit tube (40). The control box (38) causes various functions of the suction simulation system (1) to occur, including causing the pump (36) to stop, start, increase flow rate, decrease flow rate, etc.

Referring back to FIG. 1, in one embodiment, the pump exit tube (40) flows the simulated mucus (25) into the manikin inlet (12), which is located at one or multiple points along the manikin (10), and into the airway (11) of the manikin (10). In one embodiment, the manikin inlet (12) is defined in the torso (13) region of the manikin (10). The manikin inlet (12) is in fluid communication with the pump (36) and the airway (11) of the manikin (10) to allow simulated mucus (25) to flow from the pump (36) to the airway (11) of the manikin (10). The simulated mucus (25) is flowed to obstruct the airway (11) of the manikin (10) to produce the effects that students (23) need to learn and practice mechanical ventilation.

With continued reference to FIG. 1, in one embodiment of the invention, the suction simulation device (3) may include a control device (42) in electrical communication with the pump (36) to control the pump (36). For instance, the control device (42) may allow for an instructor or individual to control the flow of simulated mucus (25) through the suction simulation system (1). The control device (42) may control the pump (36) through a wired or wireless connection. The control device (42) may be a dedicated radio controller, a smartphone application, a tablet PC, any networked PC, or any other suitable device configured to communicate with and control the pump (36).

In another embodiment of the invention, simulated mucus (25) flow is controlled by a computer (66) running a simulation software (68) (i.e., the simulation software (68) executes a mechanical ventilation scenario). The computer (66) may communicate with the breathing simulator (64) using a wired or wireless connection. The computer (66) may also communicate with the control box (38) using a wired or wireless connection. In this embodiment, the simulated mucus (25) flow is not controlled by the control device (42) but is controlled as part of a mechanical ventilation scenario of the simulation software (68). A mechanical ventilation scenario is a practice scenario used to train a student (23) (or other user) on how to properly mechanically ventilate a human patient by simulating real life situations in which mechanical ventilation is required using the anatomically correct manikin (10). The mechanical ventilation scenarios are based on realistic situations that occur in hospitals or in the field (such as a home health setting or emergency medical situation) that require use of a suction unit (16). The mechanical ventilation scenarios allow students (23) to practice proper techniques in mechanical ventilation and to prepare the students (23) to handle real-life situations.

The simulation software (68) may include at least one non-transitory computer-readable medium including program instructions that, when executed by at least one computer (66) including at least one processor, causes the at least one computer (66) to execute one of the mechanical ventilation scenarios. The simulation software (68) may control the entire mechanical ventilation scenario including the functions of the manikin (10) and its respiratory mechanics.

During the execution of the mechanical ventilation scenario, the simulation software (68) may control the flow rate of simulated mucus (25) in the suction simulation system (1) and the physical responses exhibited by the manikin (10) (such as breathing, coughing, gurgling, etc.). During the execution of the mechanical ventilation scenario, the simulation software (68) may relay simulated medical information of the manikin (10) (i.e., the simulated patient) to the at least one monitor viewable by the student (23) training on the suction simulation system (1). The simulation software (68) also provides feedback to the student (23) (and/or the student's (23) instructor) after the mechanical ventilation scenario in order for the simulation to be analyzed. This may include overlaying simulated medical information with information from the suction unit (16) to analyze the student's (23) technique for aspirating the manikin's (10) clogged airway (11).

With continued reference to FIG. 1, the suction simulation system (1) may also include a breathing simulator (64). For instance, the suction simulation system (1) may include the ASL 5000 Breathing Simulator from IngMar Medical, Ltd. of Pittsburgh, Pa. In some embodiments, the simulation software (68) is an add-on to the breathing simulator (64). The breathing simulator (64) may be used to cause physical responses of the manikin (10). For instance, the breathing simulator (64) may cause the manikin (10) to breath, cough, gurgle, snore, and other typical patient responses. In one scenario, the breathing simulator (64) may initiate a cough from the manikin (10) when suction is detected, which is a typical patient response in real-life circumstances. The breathing simulator (64) may also flow gas, such as air or oxygen, through a breathing simulator tube (65) into the airway (11) of the manikin (10) as part of the suction simulation system (1). In other words, the breathing simulator (64) is in fluid communication with the airway (11) via the breathing simulator tube (65) to flow air into the airway (11) (see FIG. 1).

In one embodiment, airflow readings from the endotracheal tube (70) inserted into the manikin's (10) airway (11) to ventilate the manikin (10) may be sent to the breathing simulator (64) to perform calculations as part of the overall simulation. Alternatively, pressure signals from pressure transducers or pressure gauges on the endotracheal tube (70) (described in detail below) may transmit their pressure readings to the breathing simulator (64) to perform calculations for the simulation. The breathing simulator (64) may recognize that suction is occurring by reading a significant negative pressure in the manikin's (10) airway (11).

Referring to FIGS. 4-7, the endotracheal tube (70) may include a proximal end (44) configured to fit with a tube connector (46). The endotracheal tube (70) may also include a distal end (48) terminating in a tube end (50), which is an opening at the distal end (48) of the endotracheal tube (70). The endotracheal tube (70) may include a cuff (72). The cuff (72) engages the endotracheal tube (70) in place in the trachea, in a manner known in the art. The endotracheal tube (70) may be inserted into the airway (11) of the manikin (10) with the distal end (48) first being inserted into the airway (11). The endotracheal tube (70) may be coupled to the ventilator (5). To clear the endotracheal tube (70) and the airway (11) of simulated mucus (25), the ventilator (5) may be decoupled from the endotracheal tube (70), and the suction catheter (22) may then be inserted into the endotracheal tube (70) to suction the simulated mucus (25) in the endotracheal tube (70) and causing an obstruction in the manikin's (10) airway (11). The suction catheter (22) may then be removed and the ventilator (5) recoupled to the endotracheal tube (70). In embodiments in which the endotracheal tube (70) is not inserted into the manikin's (10) airway (11), the suction catheter (22) may be inserted directly into the airway (11) to suction the simulated mucus (25).

Figure 4:
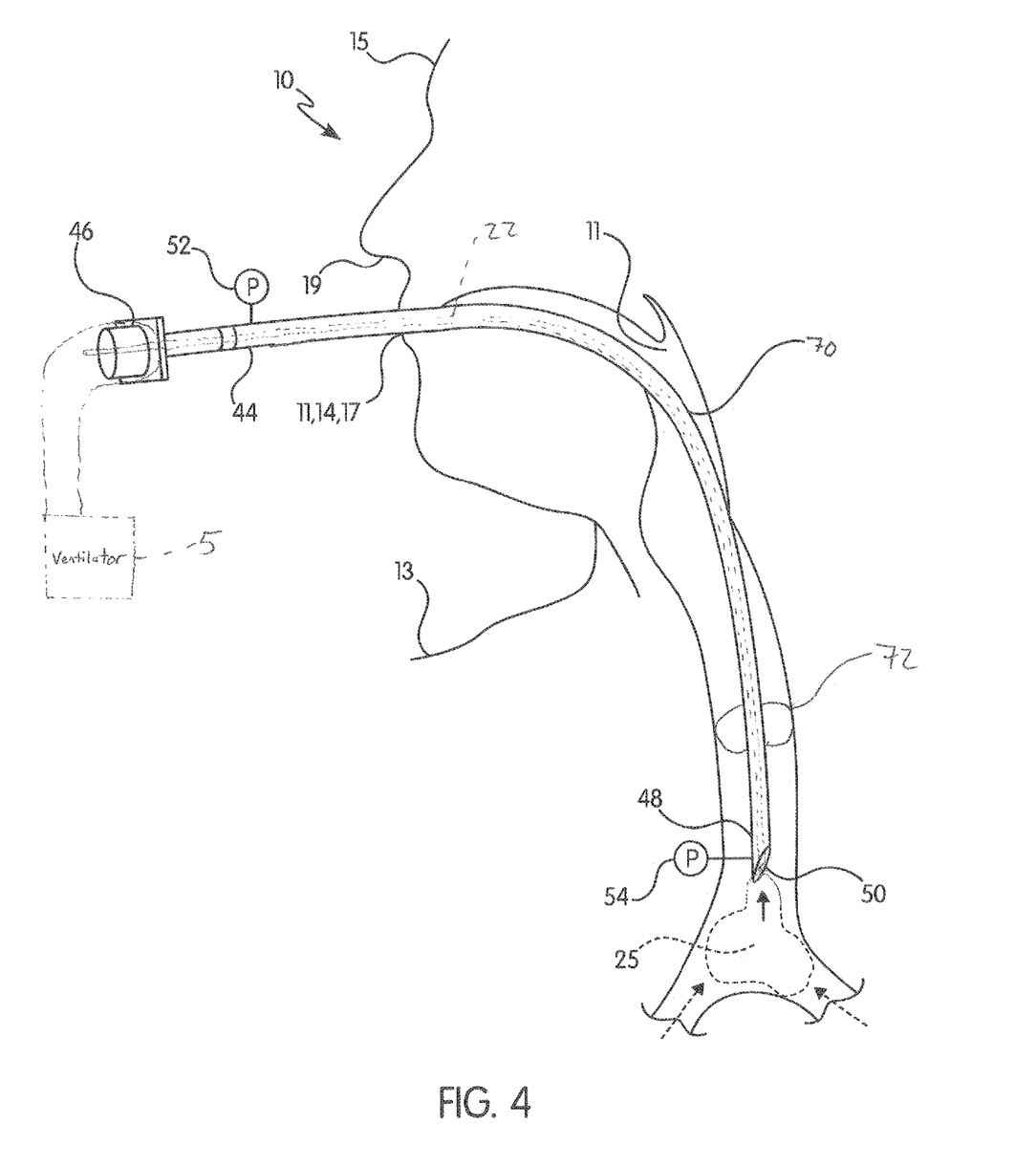
FIG. 4 shows a schematic diagram of one embodiment of an endotracheal tube inserted into the airway of a manikin with a suction catheter inserted into the endotracheal tube.
Figure 5:
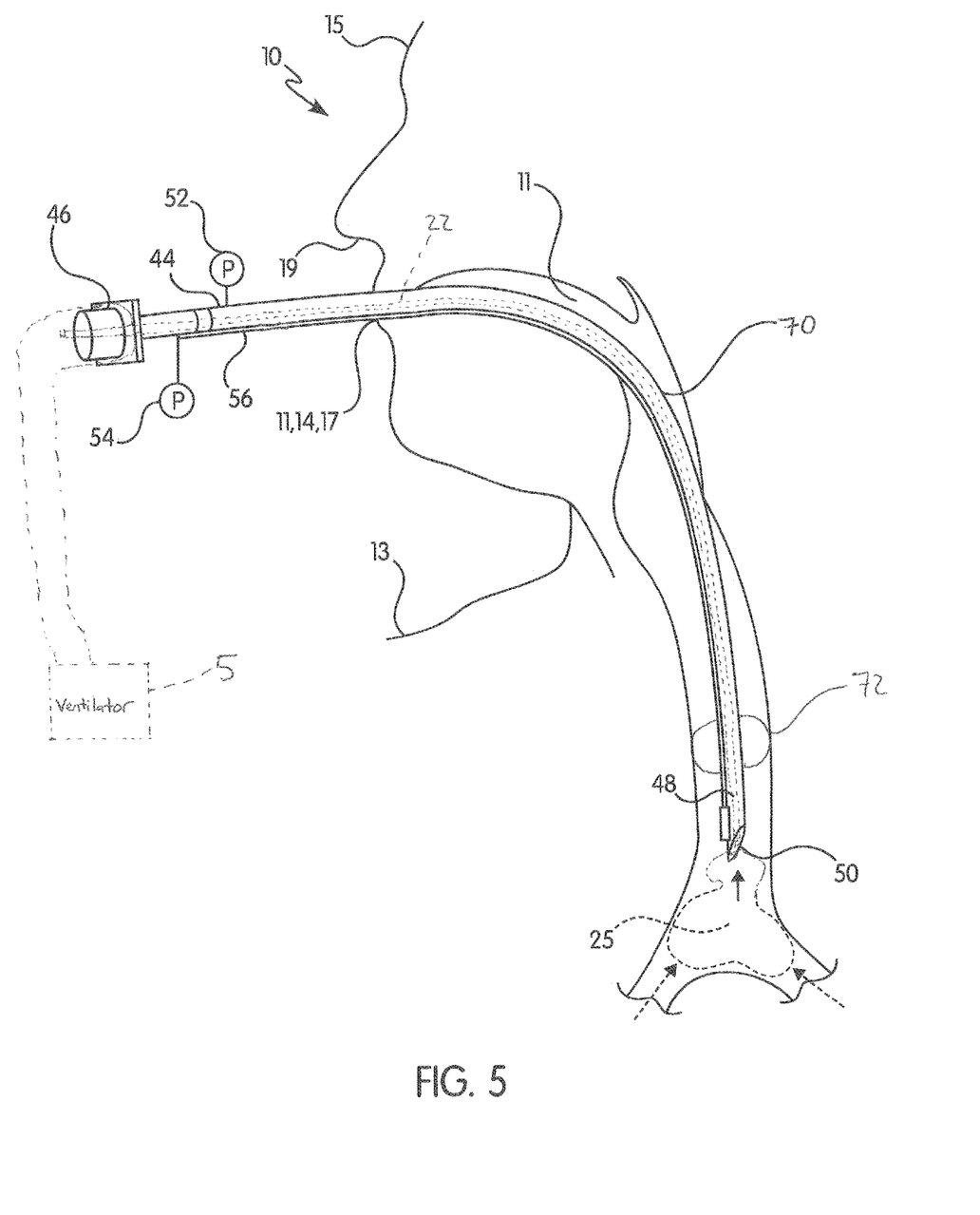
FIG. 5 shows a schematic diagram of another embodiment of an endotracheal tube having a second lumen inserted into the airway of a manikin with a suction catheter inserted into the endotracheal tube.

Referring to FIGS. 4-5, the endotracheal tube (70) may include a plurality of pressure transducers or pressure gauges (a proximal pressure transducer (52) and a distal pressure transducer (54)), which are in communication with the simulation software (68). The proximal pressure transducer (52) may read the pressure at the proximal end (44) of the endotracheal tube (70). The distal pressure transducer (54) may read the pressure at the distal end (48) of the endotracheal tube (70). As shown in FIG. 4, in one embodiment, the proximal pressure transducer (52) may be positioned at the proximal end (44) of the endotracheal tube (70), while the distal pressure transducer (54) may be positioned at the distal end (48) of the endotracheal tube (70) near the tube end (50). In another embodiment, the proximal pressure transducer (52) may still be positioned on the proximal end (44) of the endotracheal tube (70), and the distal pressure transducer (54) may also be positioned at the proximal end (44) of the endotracheal tube (70). The distal pressure transducer (54) may be positioned at the proximal end (44) of the endotracheal tube (70) when the endotracheal tube (70) includes a lumen (56), which may be connected to the endotracheal tube (70). The lumen (56) is used to pneumatically transmit the pressure at the distal end (48) of the endotracheal tube (70) to the distal pressure transducer (54) (see FIG. 5). In other words, the lumen (56) is in fluid communication with the distal pressure transducer (54) such that the distal pressure transducer (54) may still read the pressure at the distal end (48) of the endotracheal tube (70). This embodiment may also require flow of gas into the manikin (10) through the endotracheal tube (70). The lumen (56) may be positioned within the endotracheal tube (70) itself. The lumen (56) may also be positioned just below the endotracheal tube (70), as shown in FIG. 5.

The pressure transducers (52, 54) of the endotracheal tube (70) allow the student (23) to determine whether the simulated mucus (25) has been sufficiently cleared from the airway (11). The pressure differential ($\Delta P$) (between the proximal end (44) and the distal end (48) of the endotracheal tube (70)) together with information about airflow allows the flow resistance of the artificial airway (11) to be calculated. For a given size of the endotracheal (70), this resistance is known. If simulated mucus (25) causes an obstruction in the airway (11), the resistance will be dramatically increased, which is an indication that suction is necessary from the suction catheter (22). This increase will also be shown to the student (23) in a ventilator waveform of pressure and flow projected on a monitor. Once the airway (11) is properly ventilated, the resistance value will return to normal levels. As previously mentioned, the information about airflow is fed from a breathing simulator (64) to perform calculations as part of the overall mechanical ventilation scenario controlled by the simulation software (68). The pressure (or pressure differential ($\Delta P$)) signals may be transmitted to the breathing simulator (64) to perform these calculations.

The distal pressure transducer (54) of the endotracheal tube (70) also allows the technique of the student (23) handling the suction catheter (22) to be assessed to ensure proper technique. The pressure at the distal end (48) of the endotracheal tube (70) is an indicator of proper technique because no excessive negative pressures should be used for suctioning a patient, and the distal pressure transducer (54) may monitor this pressure.

Figure 6:
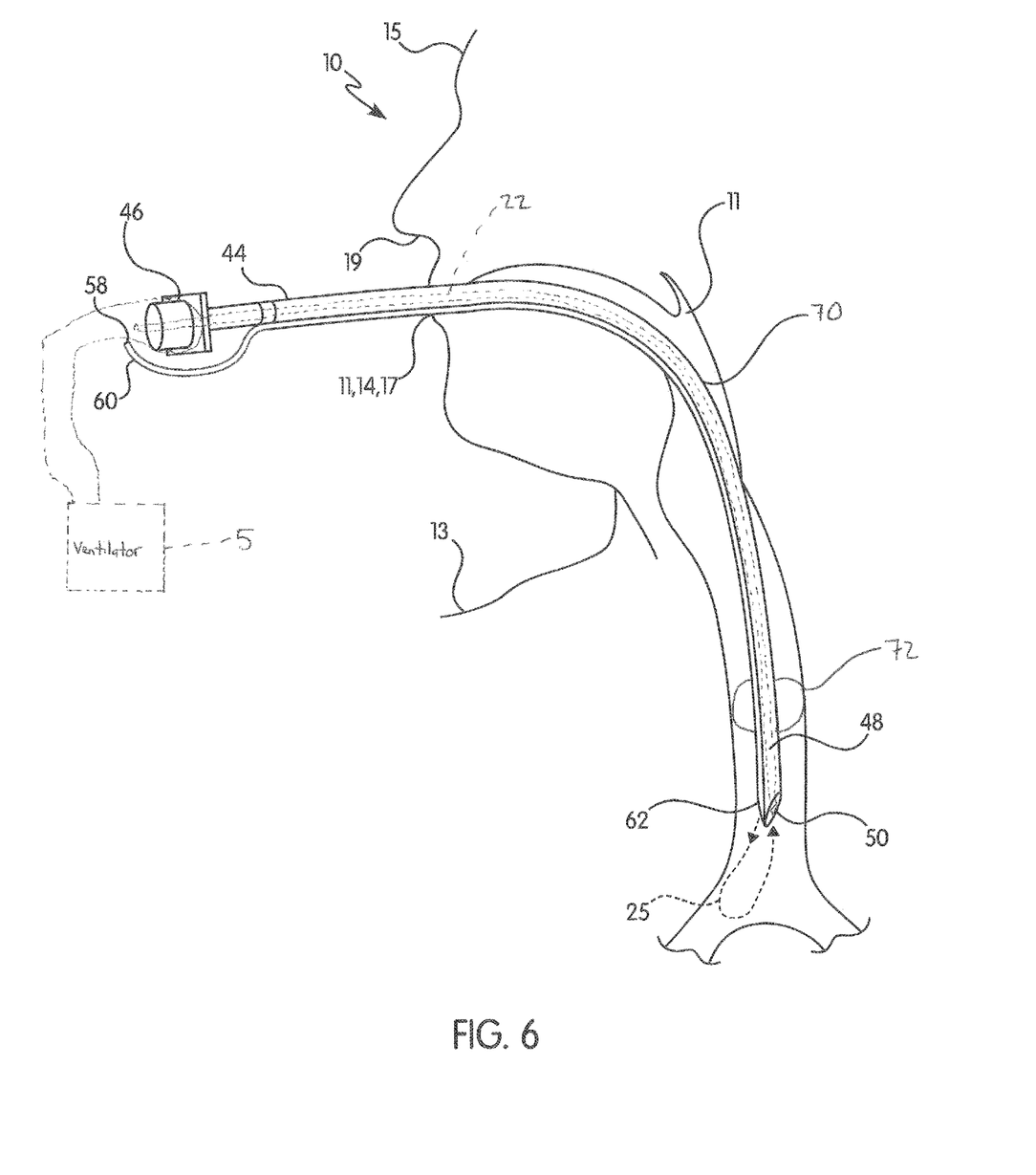
FIG. 6 shows a schematic diagram of one embodiment of an endotracheal tube connected to a fluid inlet tube and inserted into the airway of a manikin together with a suction catheter inserted into the endotracheal tube.

Referring to FIG. 6, another embodiment of the suction simulation system (1) flows simulated mucus (25) into the airway (11) of a manikin (10) through a fluid inlet tube (58) inserted into the manikin outlet (14) in addition to, or in lieu of, the simulated mucus (25) flown into the manikin (10) through the manikin inlet (12). In certain embodiments, the fluid inlet tube (58) is provided instead of the manikin inlet (12). The fluid inlet tube (58) is in fluid communication with the pump (36), and the fluid inlet tube (58) may co-act with the endotracheal tube (70) so that the endotracheal tube (70) and fluid inlet tube (58) are configured to be inserted into the airway (11) of the manikin (10) together. The fluid inlet tube (58) may include a proximal end (60) through which simulated mucus (25) enters the fluid inlet tube (58) and a distal end (62) through which the simulated mucus (25) exits the fluid inlet tube (58) and flows into the airway (11) (when inserted into the manikin (10)). As shown in FIG. 6, the fluid inlet tube (58) may be a separate tube running next to the endotracheal tube (70) and may be connected to the endotracheal tube (70). The simulated mucus (25) introduced into the airway (11) through the fluid inlet tube (58) may then be suctioned out by the suction catheter (22) inserted into the endotracheal tube (70) after the ventilator (5) has been decoupled from the endotracheal tube (70).

It is noted that in the embodiment shown in FIG. 6 in which simulated mucus (25) enters the airway (11) of the manikin (10) through the fluid inlet tube (58) instead of the manikin inlet (12), the fluid inlet tube (58) may be incorporated into the suction simulation system (1) shown in FIG. 1 to replace the manikin inlet (12). In this situation, the fluid inlet tube (58) is in fluid communication with the pump (36)

(rather than the pump (36) being in fluid communication with the manikin inlet (12)). Thus, in one embodiment, simulated mucus (25) may be pumped from the suction unit (16) by the pump (36) and enter the manikin (10) via the fluid inlet tube (58) where it is subsequently suctioned out of the manikin (10) by the suction catheter (22) and back into the suction unit (16). The embodiment in FIG. 6 provides the advantage of allowing critical "mucus-wetted" components to be completely removed from the manikin (10), allowing for easier periodic cleaning of the suction simulation system (1).

Figure 7:
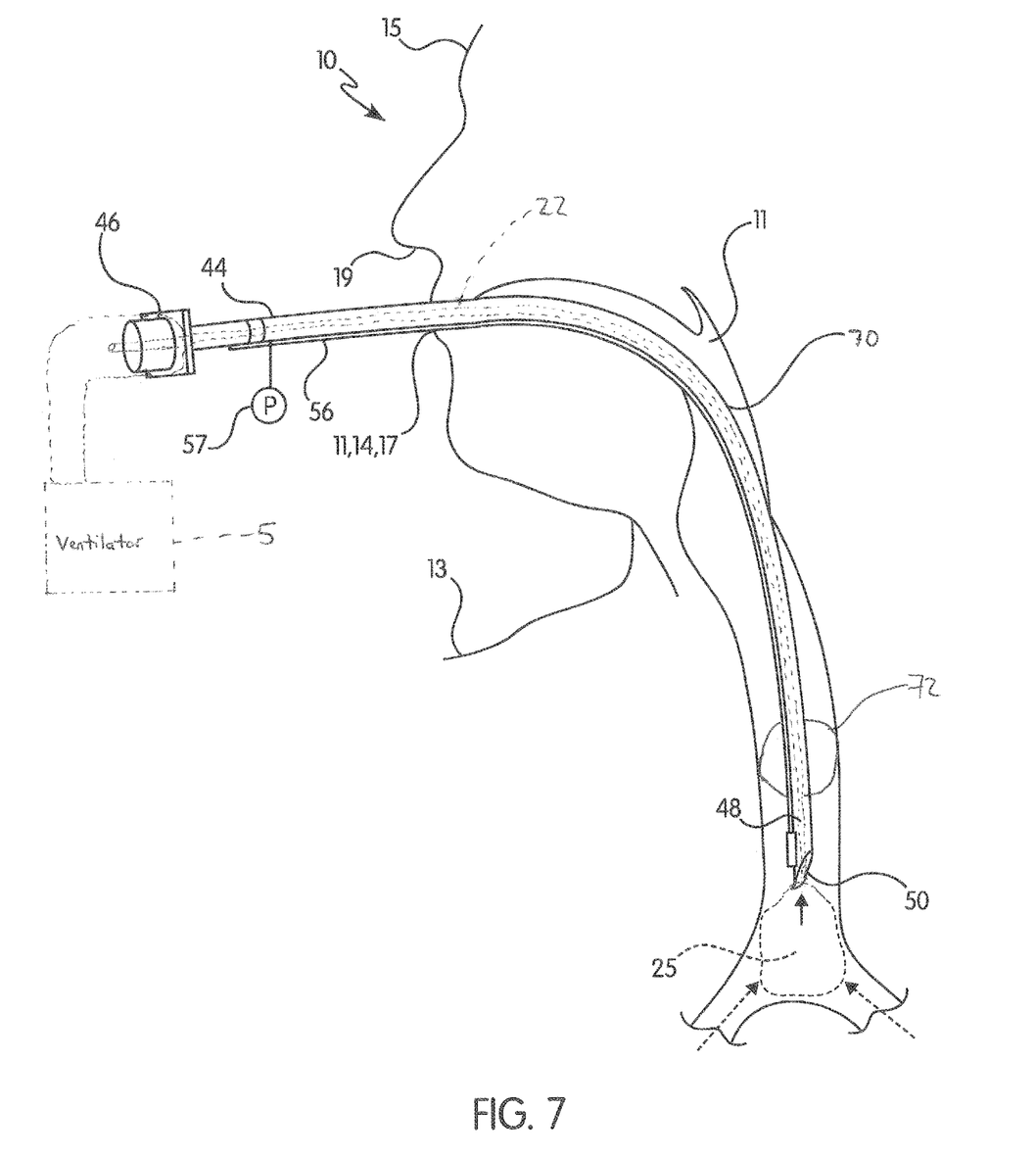
FIG. 7 shows a schematic diagram of one embodiment of an endotracheal tube having a single pressure transducer with a suction catheter inserted into the endotracheal tube.

Referring to FIG. 7, another embodiment of the endotracheal tube (70) is shown. This embodiment may include a single pressure transducer (57) which determines the pressure differential between the proximal end (44) and the distal end (48) of the endotracheal tube (70). The pressure transducer (57) can determine this pressure differential by any sufficient means. In one embodiment, the pressure transducer (57) is positioned at the proximal end (44) of the endotracheal tube (70) to read the pressure at the proximal end (44) of the endotracheal tube (70) and to read the pressure at the distal end (48) of the endotracheal tube (70) using the lumen (56). Thus a single transducer (57) may be used to determine the pressure differential across the endotracheal tube (70).

Flow of simulated mucus (25) in the suction simulation system (1) begins by flowing simulated mucus (25) from the reservoir (24) of the suction unit (16) to the airway (11) of the manikin (10) (via the manikin inlet (12) and/or the fluid inlet tube (58)) using the pump (36). The simulated mucus (25) obstructs the airway (11) of the manikin (10). The suction catheter (22) is then inserted into the endotracheal tube (70) in the airway (11) after the endotracheal tube (70) is decoupled from the ventilator (5), and at least some of the simulated mucus (25) is then aspirated out of the airway (11) by the suction catheter (22) controlled by the student (23). The endotracheal tube (70) is then recoupled to the ventilator (5) after the simulated mucus (25) is removed by the suction catheter (22), which is also removed from the endotracheal tube (70). As previously discussed, gas fed into the airway (11) by the breathing simulator (64) may be simultaneously aspirated out of the airway (11). The simulated mucus (25) suctioned by the student (23) then returns to the reservoir (24) of the suction unit (16). Thus, the simulated mucus (25) is "recycled" for multiple passes, which reduces the amount of simulated mucus (25) needed and the amount of simulated mucus (25) that is later cleaned away.

The suction simulation system (1) is used to train students (23) to recognize the signs of an obstructed airway (11), to properly mechanically ventilate the obstructed airway (11), and to recognize the indications that the patient's airway (11) has been successfully cleared.

A mechanical ventilation scenario (simulation) starts with the manikin (10) having an unobstructed airway (11). The manikin's (10) simulated medical information is relayed to the student (23) by displaying the simulated medical information on monitors, such as vital signs and oxygen saturation. The student (23) may also see physical responses exhibited by the manikin (10), such as seeing the manikin's (10) simulated breathing. Next, simulated mucus (25) is delivered to the manikin (10), either by an instructor using the control device (42) to control the pump (36) or as dictated by a scenario of the simulation software (68). The breathing simulator (64) may also flow gas into the airway (11) of the manikin (10). The simulated mucus (25) delivered to the manikin (10) accumulates in the airway (11) of the manikin (10) to create an obstruction, such as a mucus plug. Meanwhile, the monitors continue to display the manikin's (10) simulated medical information, allowing the student (23) to notice a change in factors, such as the respiratory rate and oxygen saturation as simulated mucus (25) builds up in the manikin's (10) airway (11). The student (23) also looks for changes in the physical responses exhibited by the manikin (10), such as coughing, gurgling, or irregular breathing. The instructor or the simulation software (68) have control over the flow of simulated mucus (25), including both the rate of simulated mucus (25) delivered to the manikin (10) and the timing at which the flow rate of simulated mucus (25) changes in order to accurately reproduce realistic scenarios requiring mechanical ventilation. The student (23) then passes the suction catheter (22) into the endotracheal tube (70) to clear any mucosal obstruction introduced to the manikin's (10) airway (11). The manikin's (10) simulated medical information is still monitored at this stage so that the student (23) can evaluate whether the manikin (10) is being properly ventilated and to determine when the manikin's (10) airway (11) is no longer obstructed. The student (23) also looks for physical responses exhibited by the manikin (10) that indicate that the airway (11) is no longer obstructed. The suction catheter (22) is then removed from the endotracheal tube (70), and the endotracheal tube (70) is recoupled to the ventilator (5).

In some embodiments, during a simulation, the simulation software (68) may collect information that is later used to debrief the student (23). Information collected includes the simulated medical information that is continuously monitored from the manikin (10) during the simulation, such as vital signs and oxygen saturation. It may also collect the flow rate of the simulated mucus (25) from the pump (36). This information is used by the instructor to create timelines and graphs that show the students (23) how the events of the simulation (e.g., development of mucus plug, start of aspiration, successful aspiration of the patient's airway (11)) match up to the simulated medical information of the manikin (10). Ultimately, the feedback from the debriefing helps train students (23) to properly mechanically ventilate an obstructed airway (11).

Figure 8:
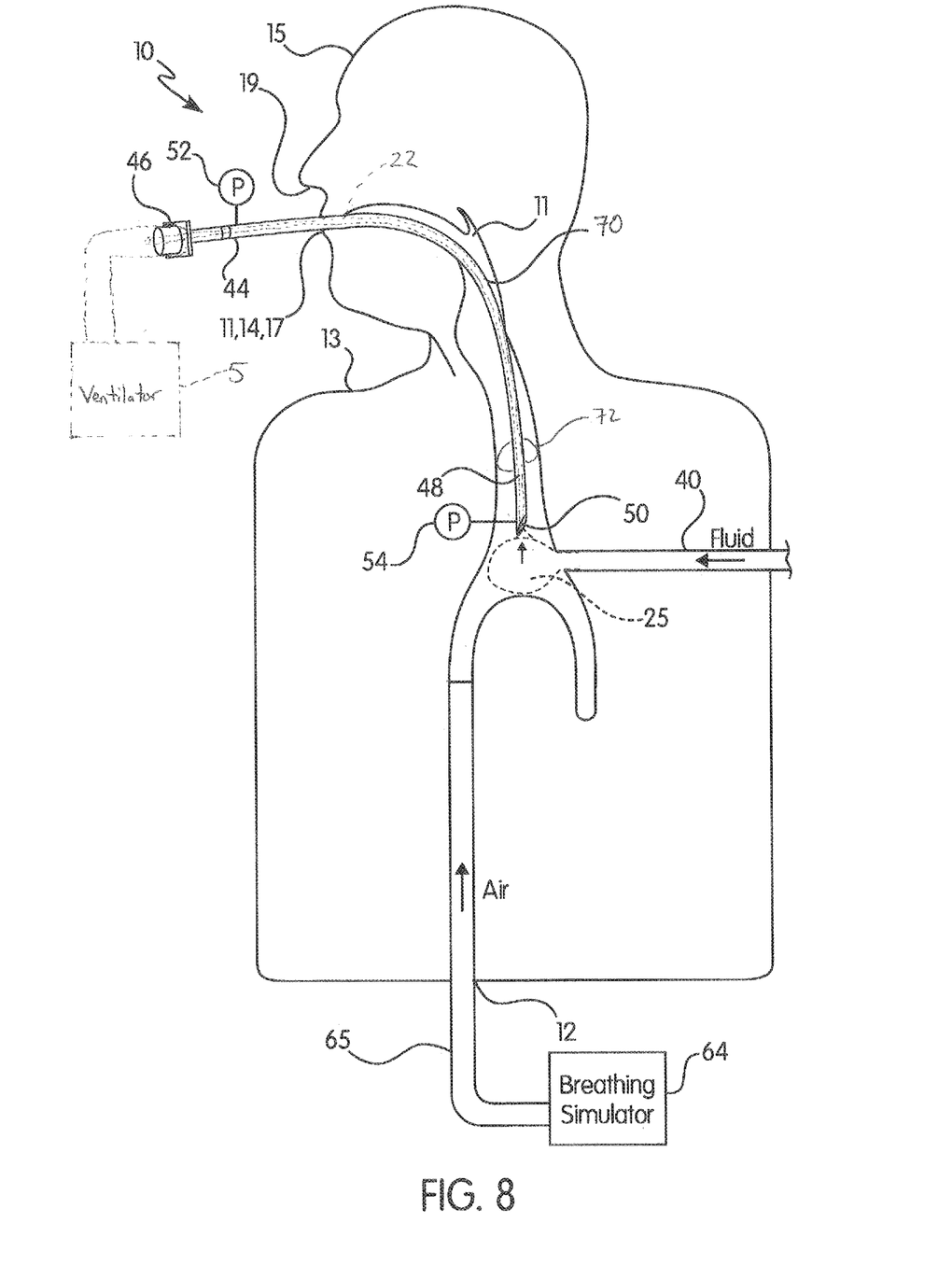
FIG. 8 shows a cross-section of one embodiment of the manikin showing fluid and air being flowed into the airway.

Referring to FIG. 8, a cross-section of the manikin (10) shows simulated mucus (25) and air being flowed into the airway (11) of the manikin (10). In this embodiment, air can be flowed from the breathing simulator (64) through the breathing simulator tube (65) and into the airway (11) of the manikin (10). The breathing simulator tube (65) can enter the manikin (10) through the manikin inlet (12) and continue on to the airway (11) (such that the breathing simulator (64) is in fluid communication with the airway (11) via the breathing simulator tube (65)). The simulated mucus (25) exiting the pump (36) (not shown) can flow through the pump exit tube (40) and into the airway (11) of the manikin (10). In some embodiments, the pump exit tube (40) enters the manikin (10) through the manikin inlet (12), but the pump exit tube (40) can enter the manikin (10) at any point along the manikin (10), such as at a point along the torso (13) of the manikin (10) as in FIG. 8. Thus, the pump (36) is in fluid communication with the airway (11) via the pump exit tube (40).

In one embodiment, the manikin (10) of the suction simulation system (1) is easily cleaned based on the design of the manikin (10). In one embodiment, the airway (11) of the manikin (10) is configured with all "sensitive" components, such as electromechanical and electronic components, located outside of the manikin (10), for instance, in an external control box (not shown), such as, for example, pressure flow transducers, gas valves, analogs, etc. Thus, the manikin (10) that has simulated mucus (25) flowing into its airway (11) during a simulation may easily and rigorously be cleaned afterwards. In another embodiment previously described in connection with FIG. 6, all critical "mucus-wetted" components may be completely removed from the manikin (10), allowing for easier periodic cleaning.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A suction simulation system, comprising:
   a suction simulation device, comprising:
      a suction catheter;
      a suction unit in fluid communication with the suction catheter, the suction unit comprising a reservoir for holding fluid and the suction unit configured to provide suction to the suction catheter;
      a pump in fluid communication with the suction unit, the pump configured to flow the fluid from the reservoir; and
      an endotracheal tube comprising a proximal end and a distal end, the endotracheal tube further comprising a distal end pressure transducer configured to read a pressure at the distal end of the endotracheal tube and a proximal end pressure transducer configured to read a pressure at the proximal end of the endotracheal tube, wherein the endotracheal tube is configured to be in fluid communication with the suction catheter when the suction catheter is used to remove fluid from an airway; and
   a breathing simulator programmed to:
      receive pressure readings from the distal end pressure transducer and proximal end pressure transducer; and
      based on the received pressure readings, cause a physical response from a manikin.

2. The suction simulation system of claim 1, further comprising:
   the manikin comprising an airway configured to hold fluid, wherein the suction simulation device is adapted for use with the manikin's airway.

3. The suction simulation system of claim 2, wherein the breathing simulator is in fluid communication with the airway of the manikin and configured to flow gas into the airway of the manikin.

4. The suction simulation system of claim 1, wherein the suction unit further comprises a secondary reservoir in fluid communication with the reservoir.

5. The suction simulation system of claim 1, wherein the distal end pressure transducer is positioned at the distal end of the endotracheal tube.

6. The suction simulation system of claim 1, wherein the distal end pressure transducer is positioned at the proximal end of the endotracheal tube.

7. The suction simulation system of claim 6, wherein the endotracheal tube further comprises a lumen configured to transmit the pressure at the distal end of the endotracheal tube to the distal end pressure transducer.

8. The suction simulation system of claim 1, wherein the suction simulation device is configured to determine a pressure differential between the distal end and proximal end of the endotracheal tube.

9. The suction simulation system of claim 1, further comprising a fluid inlet tube comprising a distal end and a proximal end, the fluid inlet tube is in fluid communication with the reservoir.

10. The suction simulation system of claim 9, wherein the fluid inlet tube co-acts with the endotracheal tube, such that the distal end of the fluid inlet tube is positioned proximate the distal end of the endotracheal tube.

11. The suction simulation system of claim 9, wherein the proximal end of the fluid inlet tube is in fluid communication with the pump.

12. The suction simulation system of claim 1, further comprising a control device in communication with the pump and configured to control the pump.

13. The suction simulation system of claim 1, wherein the airway of the manikin is in fluid communication with the pump.

14. The suction simulation system of claim 1, further comprising simulation software for executing a mechanical ventilation scenario.

15. The suction simulation system of claim 14, further comprising at least one computer configured to execute the simulation software.

16. The suction simulation system of claim 15, wherein during execution of the simulation software, a flow rate of simulated mucus in the suction simulation system and/or a physical responses exhibited by the manikin is controlled.

17. The suction simulation system of claim 1, wherein the physical response comprises a simulated cough, burp, snore, choke, or gurgle.

* * * * *